United States Patent [19]
Isobe

[11] Patent Number: 6,000,375
[45] Date of Patent: Dec. 14, 1999

[54] VALVE TIMING CONTROL FOR INTERNAL COMBUSTION ENGINE WITH VALVE TIMING-RESPONSIVE THROTTLE CONTROL FUNCTION

[75] Inventor: Daiji Isobe, Toyohashi, Japan

[73] Assignee: Denso Corporation, Kariya, Japan

[21] Appl. No.: 09/022,121

[22] Filed: Feb. 11, 1998

[30] Foreign Application Priority Data

Mar. 19, 1997 [JP] Japan .................................. 9-066117

[51] Int. Cl.⁶ ........................................ F01L 1/34
[52] U.S. Cl. ................ 123/322; 123/399; 123/90.15
[58] Field of Search ........................... 123/399, 395, 123/90.15, 90.16, 90.17, 90.18, 348, 323, 322, 321

[56] References Cited

U.S. PATENT DOCUMENTS 5,168,851  12/1992  Itoyama et al. .

FOREIGN PATENT DOCUMENTS

| 4-203248 | of 0000 | Japan . |
| 64-080733 | of 0000 | Japan . |
| 4-287846 | 10/1992 | Japan . |
| 8-312429 | 11/1996 | Japan . |

*Primary Examiner*—Noah P. Kamen
*Assistant Examiner*—Jason Berton
*Attorney, Agent, or Firm*—Nixon & Vanderhye P.C.

[57] ABSTRACT

In a valve timing control for an engine having an electronic throttle control system, the response of a valve timing control mechanism is estimated by operating condition of the engine. In addition to controlling a relative rotation angle of the VVT, a throttle correction gain for correcting the opening angle of a throttle valve so as to be adapted to the response of the VVT is calculated. The throttle valve is controlled by the calculated gain. When the response of the VVT is slow, the opening angle of the throttle valve is corrected on the basis of the response. Thus, a rapid engine acceleration is suppressed, thereby preventing occurrence of misfire.

16 Claims, 8 Drawing Sheets

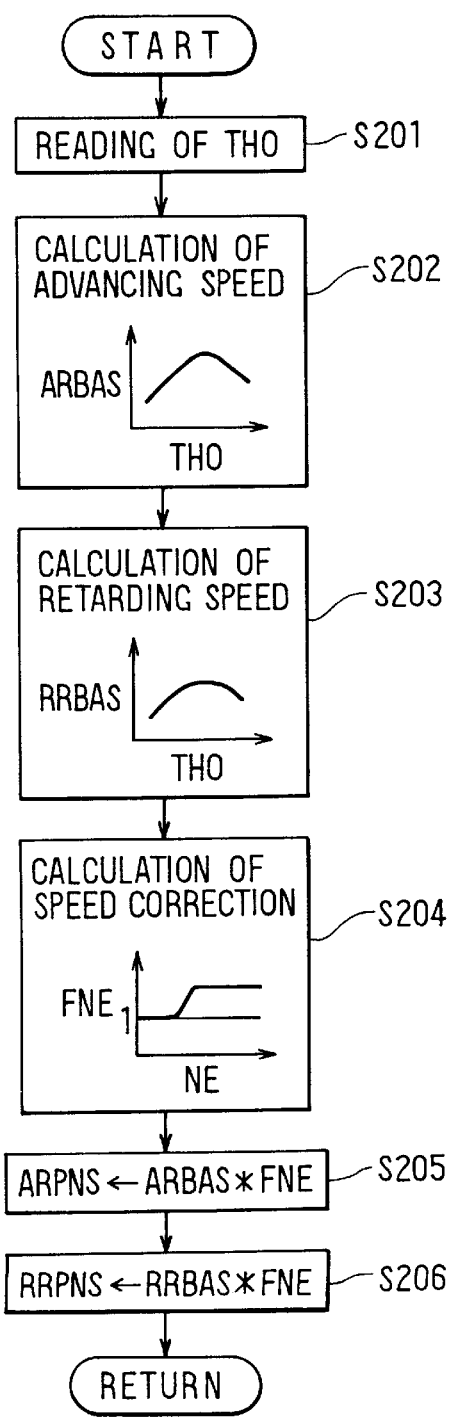
FIG. 4
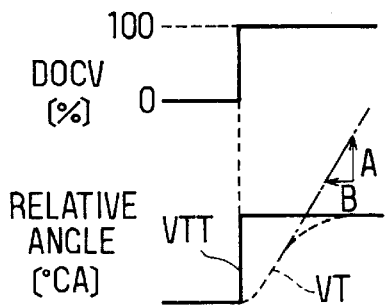
FIG. 5A
FIG. 5B
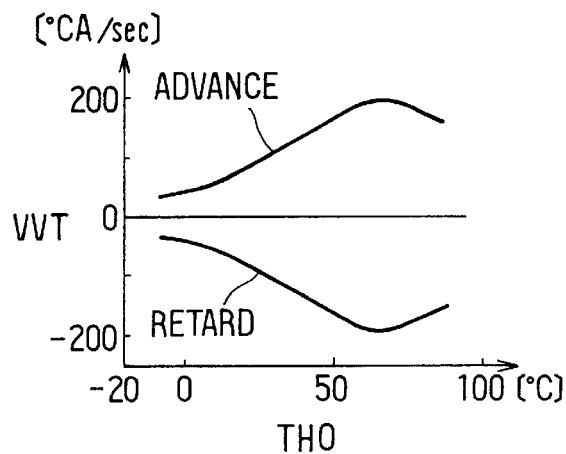
FIG. 5C
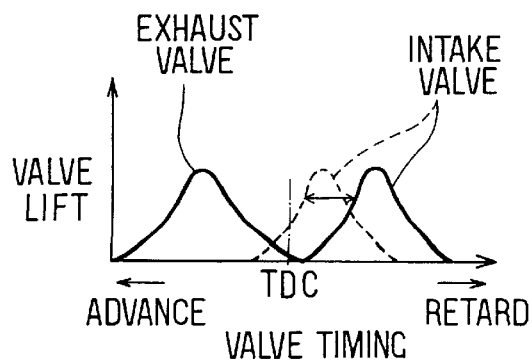
FIG. 6

VALVE TIMING CONTROL FOR INTERNAL COMBUSTION ENGINE WITH VALVE TIMING-RESPONSIVE THROTTLE CONTROL FUNCTION

CROSS REFERENCE TO RELATED APPLICATION

This application relates to and incorporates herein by reference Japanese Patent Application No. 9-66117 filed on Mar. 19, 1997.

BACKGROUND OF THE INVENTION

1. Field of the Invention

The present invention relates to a valve timing control system and method for an internal combustion engine, which can change opening and closing timings of either an inlet valve or an exhaust valve of the internal combustion engine in accordance with an engine operating condition.

2. Related Art

A typical conventional valve timing control system for an internal combustion engine is disclosed in Japanese Patent Application Laid-Open No. 64-80733. This system includes an electronic throttle system for controlling the opening angle of a throttle valve by driving an electric motor in accordance with accelerator position or the like, and a valve timing control mechanism (valve operation changing mechanism) for changing the opening and closing timings of the inlet valves of the internal combustion engine in accordance with an operating condition. A shock effect is cancelled, which is otherwise caused by the torque difference occurring when a cam in the valve timing control mechanism is changed over by changing the relation between the position of the accelerator pedal and the opening angle of the throttle valve.

SUMMARY OF THE INVENTION

It is an object of the invention to provide a valve timing control system and method for an internal combustion engine in which emission, fuel consumption, and the like are improved by a valve timing mechanism.

It is a further object of the invention to provide a valve timing control system and method for an internal combustion engine which suppresses sudden acceleration in accordance with the response of the valve timing control mechanism, thereby preventing occurrence of misfire.

According to a valve timing control of the present invention, the opening angle of a throttle valve for regulating the intake of an internal combustion engine is corrected on the basis of an estimated response of a valve timing control mechanism in addition to an accelerator pedal position. That is, when the temperature is low, i.e., the response of the valve timing control mechanism is slow, the opening angle of the throttle valve is corrected according to the response, so that the effectiveness of the valve timing control mechanism is maximally used so that the emission, fuel consumption, and the like are improved. Further, when the response of the valve timing control mechanism is slow, by suppressing sudden acceleration, occurrence of misfire is prevented.

Preferably, the response of the valve timing control mechanism is estimated on the basis of the temperature of an operating fluid. More preferably, the estimated response is corrected by engine speed. Further, preferably, the temperature of the operating fluid is indirectly detected on the basis of at least one of a present temperature of cooling water of the internal combustion engine, a temperature of cooling water at the time of start, an elapsed time from the start, the number of ignitions after the start, and the number of fuel injection times after the start, that is, the temperature of the operating fluid is estimated on the basis of a transition state of the cooling water temperature in an operating condition of the internal combustion engine and a total heating value of an explosion stroke of the internal combustion engine and friction of a cylinder and the like.

Preferably, a throttle control time constant when the opening angle of the throttle valve is controlled is calculated from the response of the valve timing control mechanism and the opening angle of the throttle valve is corrected by using the throttle control time constant. That is, sudden acceleration is suppressed by smoothing the operating speed of the throttle valve according to the response of the valve timing control mechanism by using the throttle control time constant and also by using the effectiveness of the valve timing control mechanism.

Preferably, when the response of the valve timing control mechanism is slow and it is detected that the operating condition of the internal combustion engine is rapidly shifted to engine deceleration, the valve timing control mechanism is controlled to a retard angle side on the basis of the accelerator pedal position and the throttle valve is closed with a predetermined delay time relative to the change in accelerator pedal position. Consequently, misfire of the internal combustion engine which may be caused by increase in the internal EGR (residual gas in a combustion chamber) due to delay of the valve timing control mechanism from the rapid delaying operation of the valve timing control mechanism can be prevented.

BRIEF DESCRIPTION OF THE DRAWINGS

Other objects, features and advantages of the present invention will become more apparent from the following detailed description when read with reference to the accompanying drawings. In the drawings:

FIG. 4 is a flowchart showing a processing procedure for estimating a VVT response in FIG. 3;

FIGS. 5A, 5B and 5C are characteristic charts and graph of the VVT response according to the embodiment of the invention;

FIG. 6 is a diagram illustrating advancing and retarding control according to the embodiment of the invention;

DETAILED DESCRIPTION OF THE PREFERRED EMBODIMENTS

Figure 1:
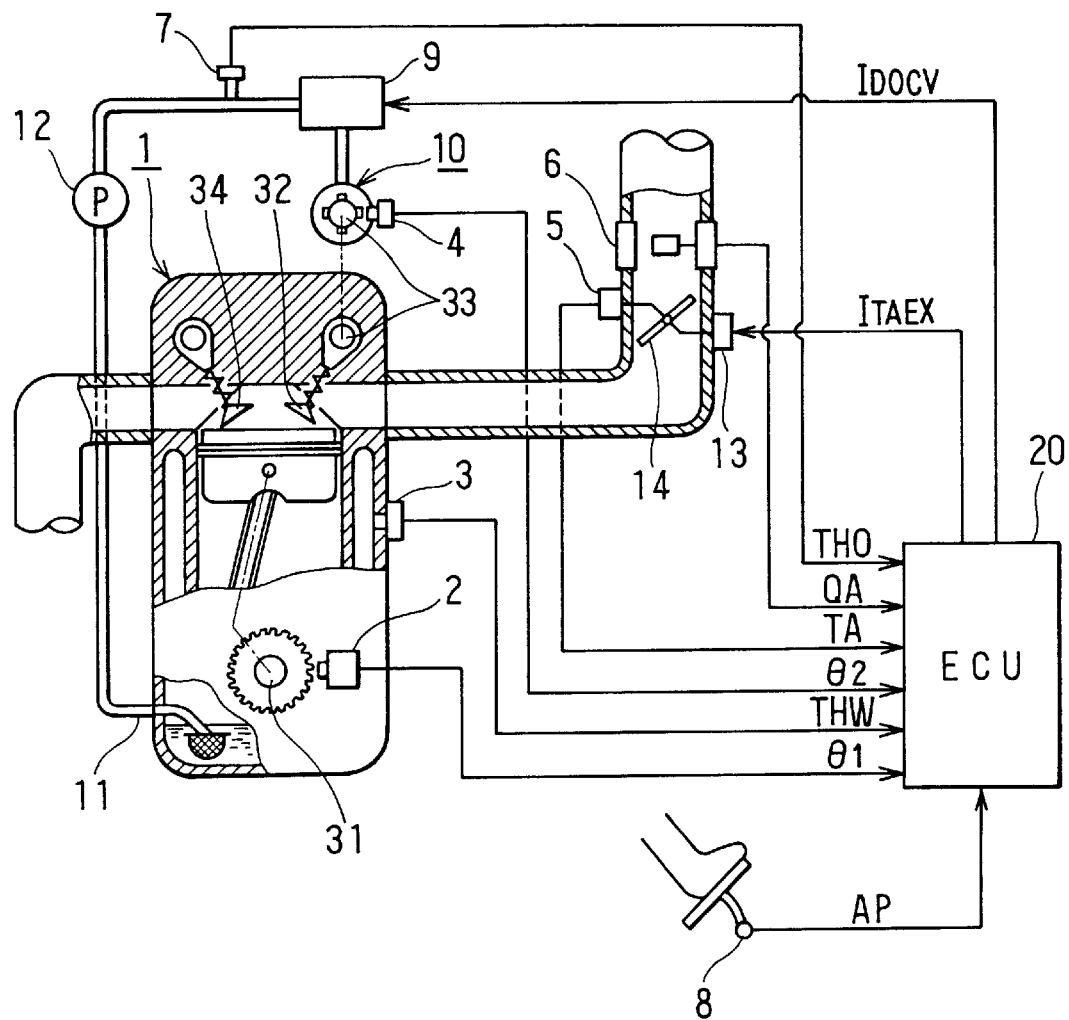
FIG. 1 is a schematic diagram showing a double overhead cam type internal combustion engine to which a valve timing control according to an embodiment of the invention is applied.

A valve timing control system for an internal combustion engine according to an embodiment of the invention is applied to a double overhead cam engine as shown in FIG. 1.

As shown in FIG. 1, the system has an internal combustion engine (IC engine) 1; a crank angle sensor 2 for detecting a rotation angle θ1 of a crankshaft 31 as a drive shaft of the IC engine 1; a water temperature sensor 3 for detecting a cooling water temperature THW of the IC engine 1; a cam angle sensor 4 for detecting a rotation angle θ2 of a camshaft 33 as a driven shaft on an inlet valve 32 side of the IC engine 1 and for calculating a relative rotation angle (displacement angle) from the phase difference between the rotation angle 2 and the rotation angle θ1 from the crank angle sensor 2; a throttle sensor 5 for detecting a throttle opening angle TA of a throttle valve 14; an intake amount sensor 6 such as an air flow meter for detecting an intake air amount QA of the IC engine 1; a fluid temperature sensor 7 which is disposed in a fluid path and detects an operating fluid temperature THO; an accelerator sensor 8 for detecting an accelerator position AP as an accelerator pedal position; a fluid(oil)-flow control valve 9 (OCV) for regulating the pressure of the operating fluid; a hydraulic variable valve timing control mechanism (VVT) 10 installed on the inlet valve 32 side as an actuator for controlling the camshaft 33 so as to have a target relative rotation angle (target displacement angle) as a target phase difference between the camshaft 33 and the crankshaft 31 by the fluid pressure regulated by the OCV 9; an oil strainer 11 for filtering the operating fluid from a fluid pan of the IC engine 1; a fluid pump 12 for forcedly feeding the operating fluid; a DC motor 13 as an actuator for driving the throttle valve 14 to a target throttle opening angle; and an ECU (Electronic Control Unit) 20 for detecting the operating condition of the IC engine 1 on the basis of input signals of various sensors, calculating an optimum control value, and outputting drive signals to the OCV 9, DC motor 13, and the like.

Figure 2:
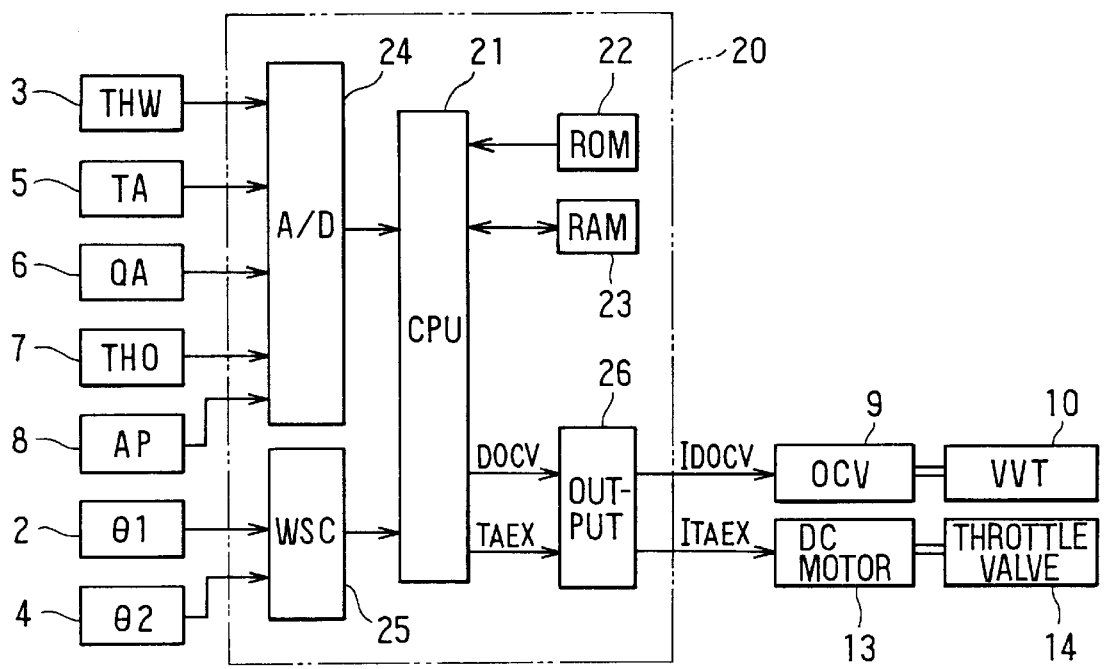
FIG. 2 is a block diagram showing an electrical construction of an ECU in the embodiment of the invention.

The ECU 20 is constructed as shown in FIG. 2 as a logic operation circuit. It comprises a central processing unit (CPU) 21; a ROM 22 in which a control program is stored; a RAM 23 for storing various data; an A/D converting circuit 24 for converting analog signals such as a cooling water temperature THW signal from the water temperature sensor 3, a throttle opening angle TA signal from the throttle sensor 5, an intake air amount QA signal from the intake amount sensor 6, a fluid temperature THO signal from the fluid temperature sensor 7, and an accelerator position Ap signal from the accelerator sensor 9 to respective digital signals; a waveform shaping circuit (WSC) 25 for shaping the waveform of a rotation angle θ1 signal from the crank angle sensor 2 and that of a rotation angle θ2 signal from the cam angle sensor 4; and an output circuit 26 for outputting a drive signal IDOCV based on an OCV duty (duty ratio) control value DOCV calculated by the CPU 21 on the basis of the various information to the OCV 9 and for outputting a drive signal ITAEX based on an output throttle opening angle TAEX to the DC motor 13.

Figure 3:
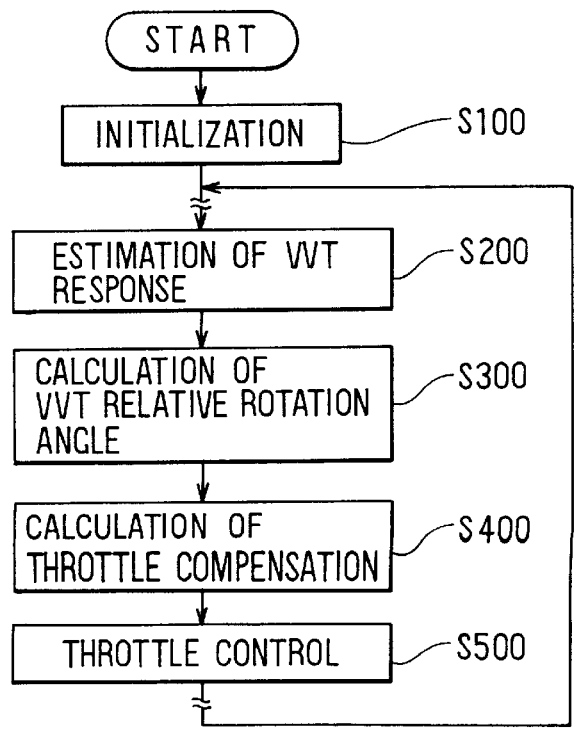
FIG. 3 is a flowchart showing a processing procedure of a base routine in a CPU in the ECU used in the embodiment of the invention.

The CPU 21 in the ECU 20 used in the valve timing control for the IC engine is programmed to execute a control processing procedure shown in FIG. 3. This base routine is repeatedly executed by the CPU 21 at every predetermined time interval.

In FIG. 3, initialization is executed in step S100 upon turn-on of a power source (at the time of start of the power source). In the initialization, the memory contents of the RAM 23 or the like are set to an initial value and input signals from various sensors are checked. After the initialization of step S100, a main control process in the loop is repeatedly executed.

In step S200, a process for estimating a response characteristic of the WT 10 from the operating condition of the IC engine 1 is performed. The processing routine is advanced to step S300 and a VVT relative rotation angle calculation process is executed. In step S400, a process for calculating a throttle compensation gain for compensating the throttle opening angle of the throttle valve 14 is executed so as to be adapted to the response of the VVT 10 estimated in step S200. In step S500, a throttle control process is executed. After that, the processing routine is returned to step S200.

The VVT response estimation processing routine in step S200 in FIG. 3 is shown in FIG. 4. This subroutine is repeatedly executed by the CPU 21 at every 120 m/sec.

The temperature THO of the operating fluid of the VVT 10 is read in step S201. In step S202, a response speed (advancing speed) ARBAS when the VVT 10 is displaced to the advance angle side in response to the fluid temperature THO read in step S201 is calculated from a table shown in FIG. 5C. The table showing the relation between the fluid temperature THO and the response speed ARBAS has, as will be described, optimum values preliminarily obtained by experiments or the like in consideration of the VVT response speed which is influenced by the fluid temperature THO. In step S203, similarly, a response speed (retarding speed) RRBAS when the VVT 10 is displaced to a retard angle side in accordance with the fluid temperature THO read in step S201 is calculated from the table shown in FIG. 5C. Since the VVT response speed has different VVT response characteristics for the same fluid temperature THO with respect to the advance angle side and the retard angle side, different tables are prepared.

As shown in FIG. 5B, when it is assumed that inclination (A/B) of a relative rotation angle VT [˚CA] which transitions so as to follow a target relative rotation angle VTT [˚CA] when the OCV Duty control value DOCV outputted to the OCV 9 is changed from 0% to 100% as shown in FIG. 5A is a VVT response speed [˚CA/sec], the VVT response speeds on the advance and retard angle sides change with the characteristics as shown in FIG. 5C according to the fluid temperature [˚C].

In the embodiment, since the fluid pump 12 for the operating fluid of the VVT 10 is driven by the IC engine 1, the discharge is in proportion to an engine speed NE. Since the same operating fluid is used to drive the VVT 10, its influence is considered. That is, a speed correction coefficient FNE for the engine speed NE is calculated from a table in step S204. The table showing the relation between the engine speed NE and the speed correction coefficient FNE has optimum values preliminarily obtained by calculation, experiments, and the like from the pump characteristics.

In step S205, the advance angle side response speed ARBAS calculated in step S202 is multiplied by the speed correction coefficient FNE, thereby obtaining a final advance angle side response speed ARPNS. In step S206, the retard angle side response speed RRBAS calculated in step S203 is multiplied by the speed correction coefficient FNE, thereby deriving a final retard angle side response speed RRPNS.

The embodiment relates to a method of performing the valve timing control by the VVT 10 only on the inlet side.

As shown in FIG. 6, the valve timing of the exhaust valve 34 is fixed at the piston top dead center position (TDC). By advancing or retarding the valve timing of the inlet valve 32, the overlap amount is controlled.

Figure 7:
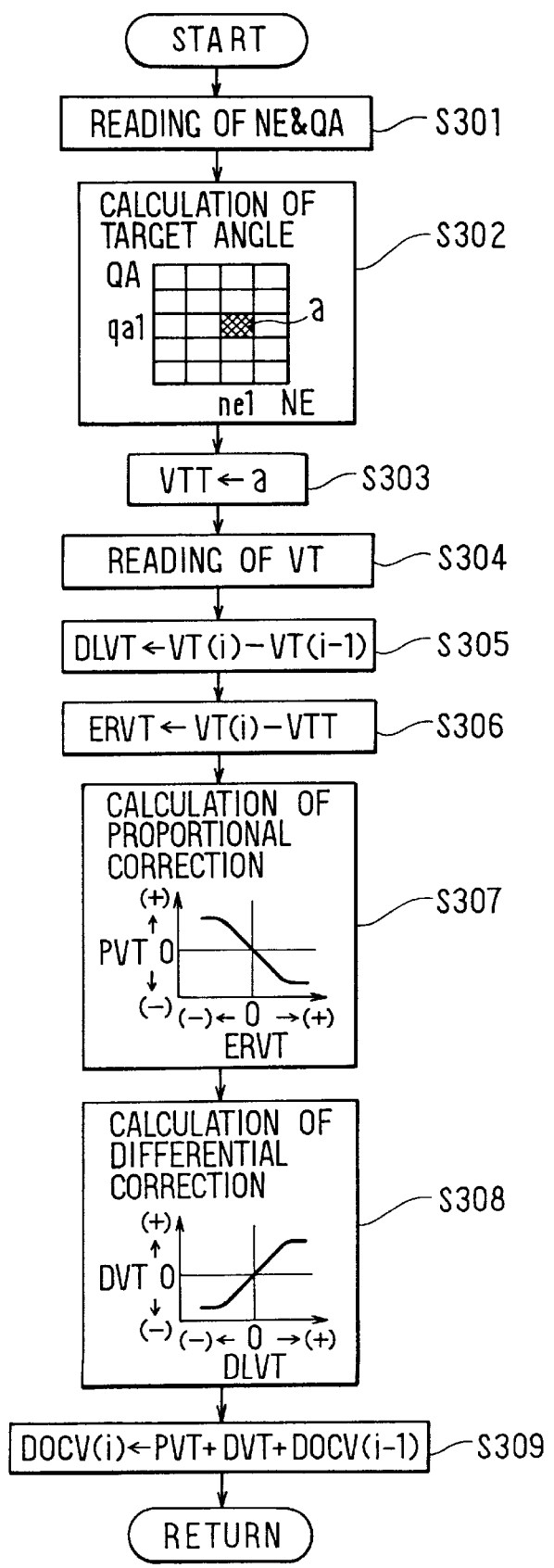
FIG. 7 is a flowchart showing a processing procedure of a VVT relative rotation angle control in FIG. 3.

The VVT relative rotation angle control processing routine in step S300 in FIG. 3 is shown in FIG. 7. This subroutine is repeatedly executed by the CPU 21 at every 16 m/sec.

The engine speed NE and the intake air volume QA are read in step S301. In step S302, a target relative rotation angle of the VVT 10 is calculated from a map on the basis of the engine speed NE and the intake air volume QA read in step S301. For example, when NE=ne1 and QA=qa1, "a" is obtained as the target relative rotation angle from the map. The target relative rotation angles obtained from the map are optimum values preliminarily obtained by calculation, experiment, or the like.

In step S303, the target relative rotation angle "a" calculated in step S302 is stored into a memory area "VVT" of the target relative rotation angle in the RAM 23. In step S304, a present relative rotation angle (or an actual relative rotation angle) of the VVT 10 based on the input signals from the crank angle sensor 2 and the cam angle sensor 4 is read out. In step S305, a differential value DLVT is calculated from a deviation between the previous relative rotation angle VT(i-1) and the relative rotation angle VT(i) of this time. In step S306, a relative rotation angle deviation ERVT is calculated from a deviation between the present relative rotation angle VT(i) and the target relative rotation angle VTT.

Figure 8:
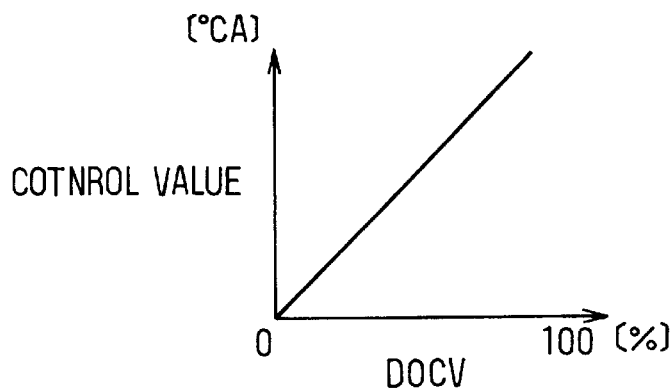
FIG. 8 is a characteristic diagram of operation of an OCV used in the embodiment of the invention.

In step S307, a P (proportional) term correction value PVT is calculated from a table on the basis of the relative rotation angle deviation ERVT calculated in step S306. In step S308, a D (differential) term correction value DVT is obtained from a table on the basis of a differential value DLVT calculated in step S305. The P term correction value PVT calculated from the table in step S307 and the D term correction value DVT calculated from the table in step S308 are optimum values preliminarily obtained by calculation, experiment, or the like. In step S309, the P term correction value PVT calculated in step S307, the D term correction value DVT calculated in step S308, and the previous OCV Duty control value DOCV are added, thereby obtaining a final OCV Duty control value DOCV. The VVT relative rotation angle is controlled by the VVT 10 to which the OCV Duty control value DOCV is supplied via the OCV 9. In the operation of the OCV 9, as shown by the characteristic diagram in FIG. 8, by increasing the fluid amount in proportion to the OCV Duty control value DOCV [%], the relative rotation angle control value [°CA] is increased.

Figure 9:
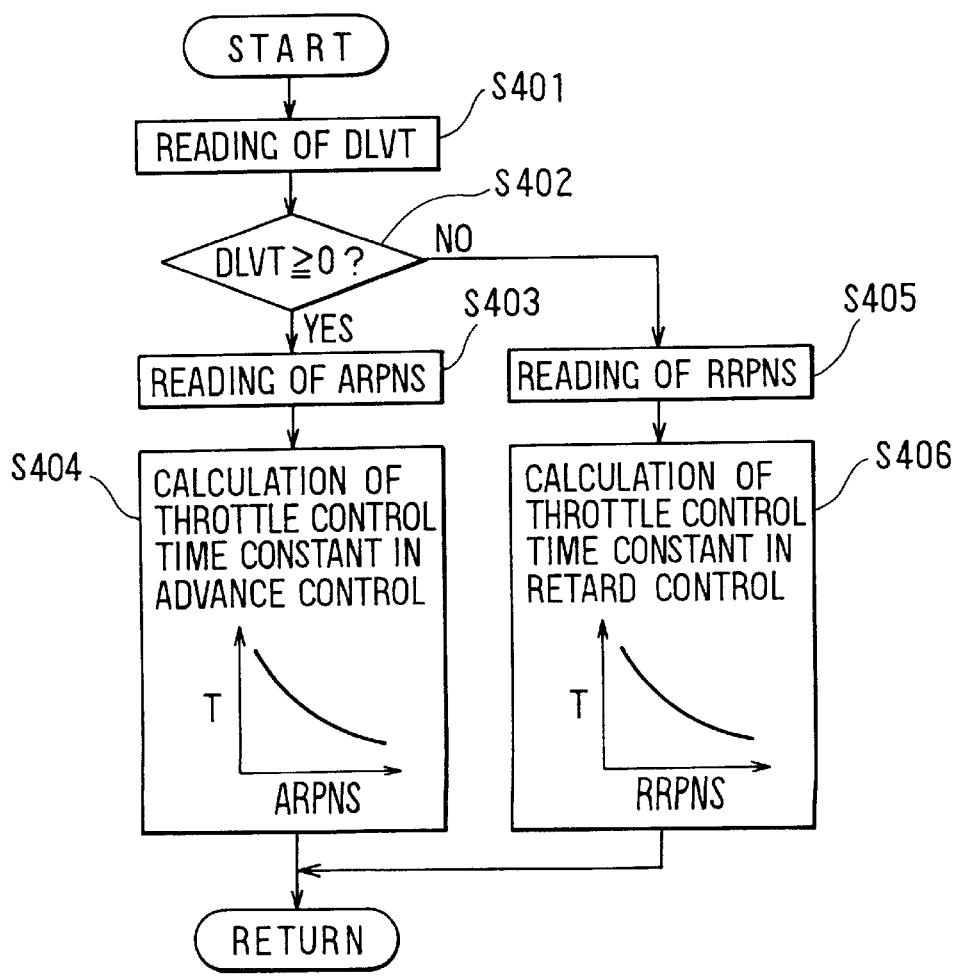
FIG. 9 is a flowchart showing a processing procedure of a throttle correction gain calculation in FIG. 3.

The throttle correction gain calculation processing routine in step S400 shown in FIG. 3 is shown in FIG. 9. This subroutine is repeatedly executed by the CPU 21 at every 8 m/sec.

The differential value DLVT calculated in step S305 in FIG. 7 is read in step S401. In step S402, whether the differential value DLVT is 0 or larger is discriminated. If the differential value DLVT is 0 or larger, it is regarded that displacement of the relative rotation angle VT to the advance angle side is instructed, and the processing routine is advanced to step S403. The advance angle side response speed ARPNS estimated and calculated from the operating condition of the IC engine 1 is read in step S205 in FIG. 4. In step s404, a throttle control time constant T at the time of the advance angle side control is calculated from the table on the basis of the advance angle side response speed ARPNS read in step S403. The throttle control time constant T corresponding to the advance angle side response speed ARPNS for controlling the operating speed of the throttle valve 14 so as to be adapted to the response of the VVT 10 is preliminarily obtained by calculation, experiment, or the like and set in the table used in step S404.

On the other hand, when the discriminating condition in step S402 is not satisfied and the differential value DLVT is smaller than 0, it is discriminated that the displacement of the relative rotation angle VT to the retard angle side is instructed. The processing routine is advanced to step S405 and the retard angle side response speed RRPNS estimated and calculated from the operating condition of the IC engine 1 in step S206 in FIG. 4 is read. In step S406, the throttle control time constant T at the time of the retard angle side control is calculated from the table on the basis of the retard angle side response speed RRPNS read in step S405. The throttle control time constant T corresponding to the retard angle side response speed RRPNS for controlling the operating speed of the throttle valve 14 so as to be adapted to the response of the VVT 10 is been preliminarily obtained by calculation, experiment, or the like and set in the table used in step S406.

Figure 10:
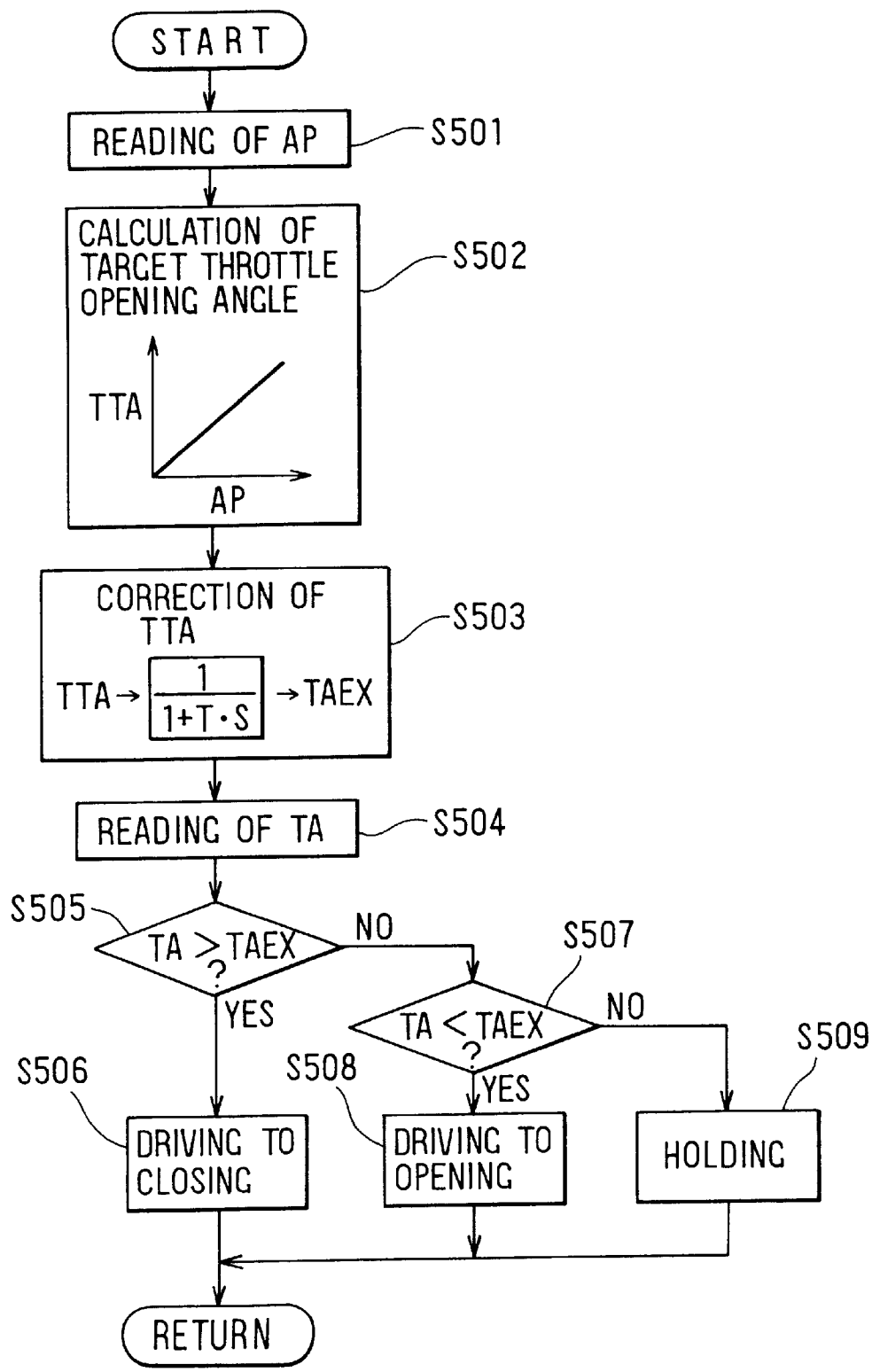
FIG. 10 is a flowchart showing a processing procedure of the throttle control in FIG. 3.

The throttle control processing routine in step S500 in FIG. 3 is shown in FIG. 10. This subroutine is repeatedly executed by the CPU 21 at every 8 m/sec.

The accelerator position Ap is read in step S501. In step S502, a target throttle opening angle TTA for the accelerator position Ap read in step S501 is derived from a table. The target throttle opening angle TTA obtained from the accelerator position Ap in consideration of drivability, controllability, and the like of the IC engine 1 is set in the table. In step S503, a final output throttle opening angle TAEX is calculated by performing gain correction to the target throttle opening angle TTA by using a model of a transfer function $\{1/(1+T \cdot S)\}$. T in the model is a throttle control time constant obtained in step S404 or S406 in FIG. 9.

In step S504, the present throttle opening angle TA is read. In step S505, whether the present throttle opening angle TA read in step S504 exceeds the output throttle opening angle TAEX calculated in step S503 or not is discriminated. When the present throttle opening TA exceeds the output throttle opening angle TAEX, the processing routine is advanced to step S506. An operating process for driving the DC motor 13 for opening and closing the throttle valve 14 to the closing side and coinciding the present throttle opening angle TA with the output throttle opening angle TAEX is performed.

On the other hand, when the discriminating condition in step S505 is not satisfied, the processing routine is advanced to step S507. Whether the present throttle opening angle TA read in step S504 is smaller than the output throttle opening angle TAEX calculated in step S503 or not is discriminated. When the present throttle opening angle TA is smaller than the output throttle opening angle TAEX, the processing routine is advanced to step S508. An operating process for driving the DC motor 13 for opening and closing the throttle valve 14 to the opening side and coinciding the present throttle opening angle TA with the output throttle opening angle TAEX is executed. On the other hand, when the discriminating condition in step S507 is not satisfied, it is discriminated that the present throttle opening angle TA is coincided with the output throttle opening angle TAEX. The processing routine is advanced to step S509, a process for stopping the DC motor 13 which opens and closes the throttle valve 14 and holding the present throttle opening angle TA is performed.

Figure 11:
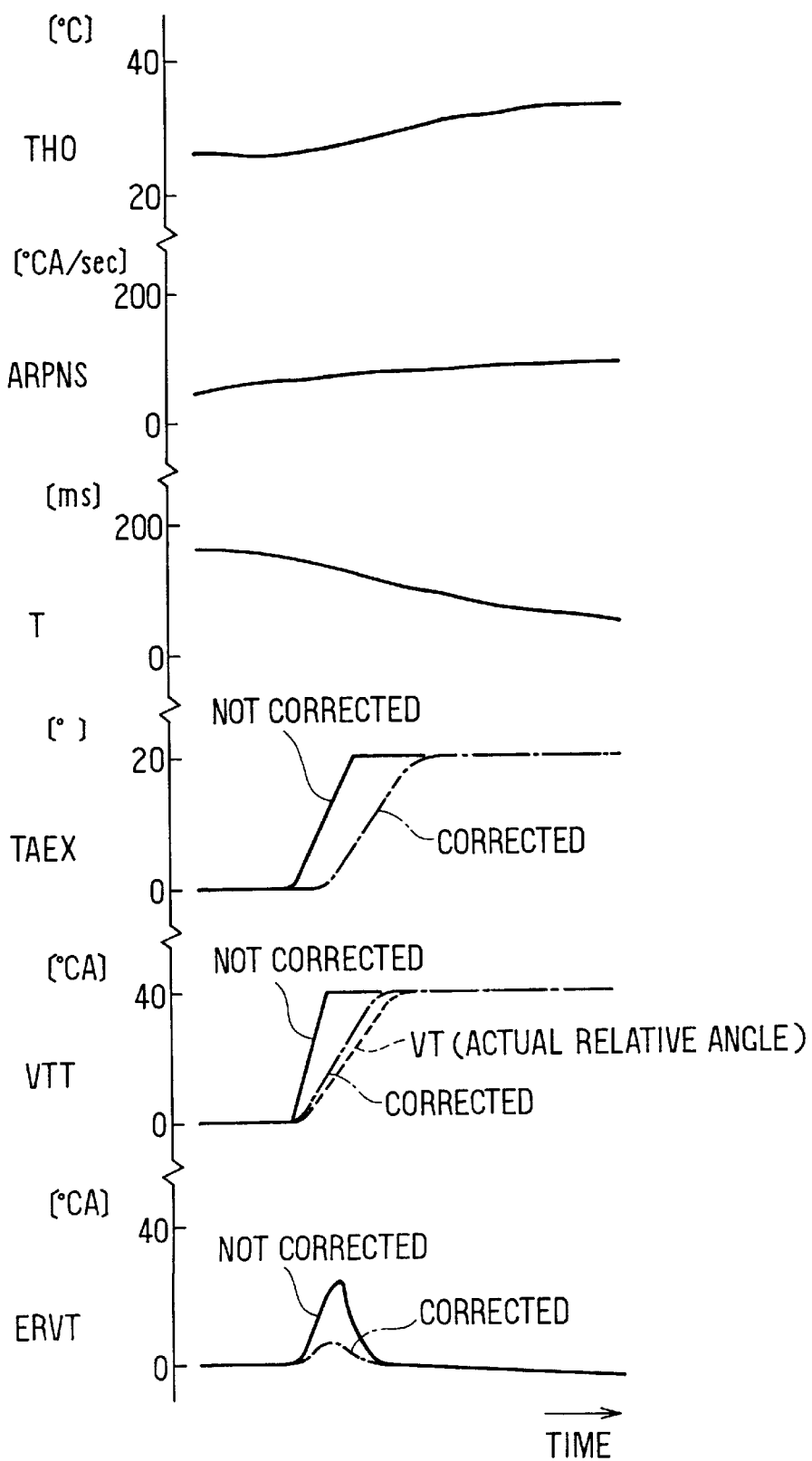
FIG. 11 is a time chart showing operation in the valve timing control according to the embodiment of the invention.

The operation of the embodiment is shown in the time chart of FIG. 11. For simplicity, the time chart shows only the control to the advance angle side of the VVT 10.

On the basis of the fluid temperature THO for operating the VVT 10, the advance angle side response speed ARPNS the VVT 10 can follow is obtained. The adapted throttle control time constant T is calculated so as not to cause misfire and or the like by acceleration/deceleration of the throttle valve 14 which is faster than the advance angle side response speed ARPNS. The throttle control speed, that is, the output or final throttle opening angle TAEX is corrected by the throttle control time constant T, thereby setting the target relative rotation angle VTT corresponding to the VVT response speed determined by the fluid temperature THO at that time. Consequently, the relative rotation angle deviation ERVT as a deviation between the target relative rotation angle VTT and the present relative rotation angle VT can be suppressed. Thus, the response performance of the valve timing of the IC engine 1 in a fuel system or ignition system control is preferable and the drivability, emission, and the like are improved.

Figure 12:
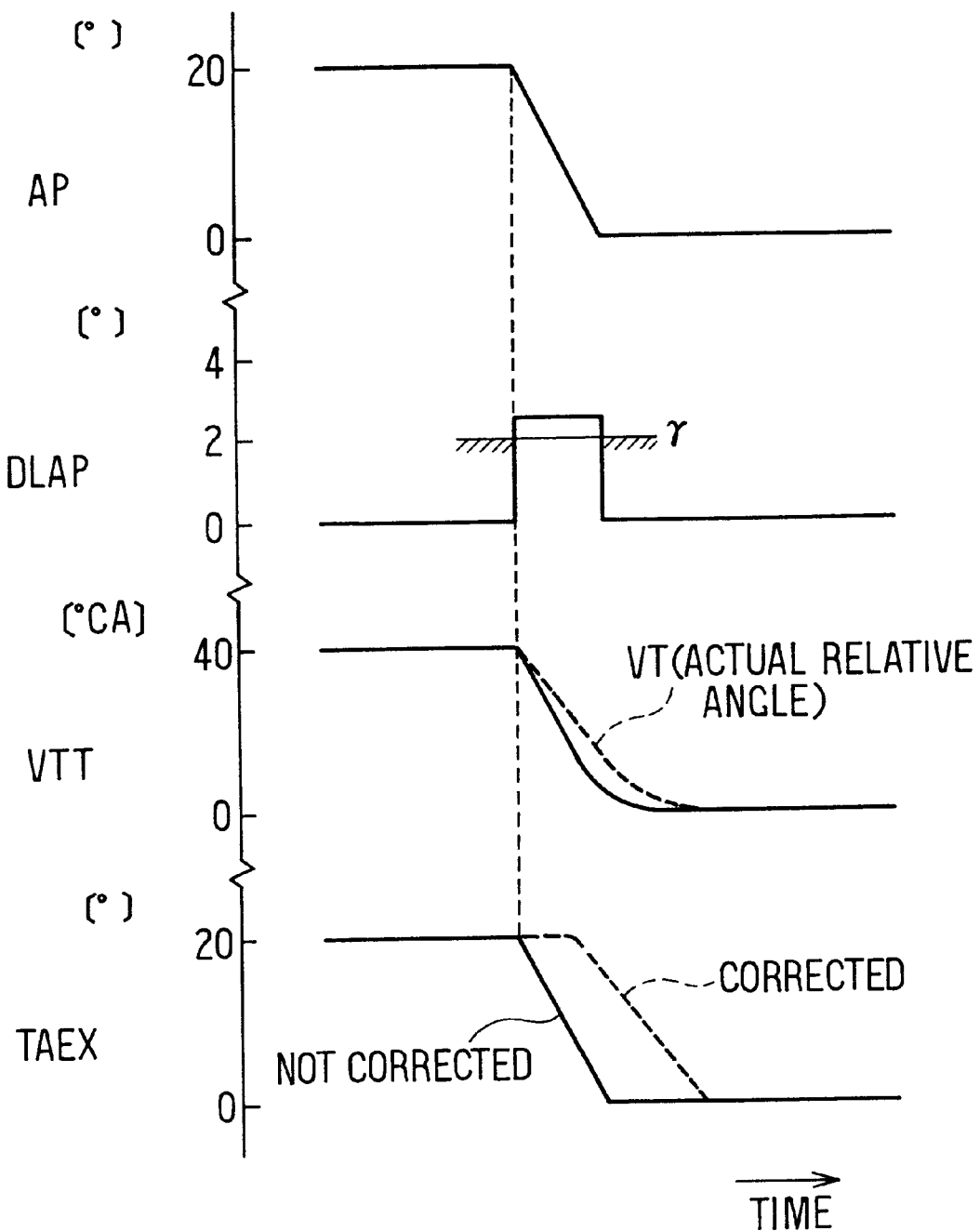
FIG. 12 is a time chart showing a modified embodiment of the invention.

Although the operating speed of the throttle valve 14 is smoothed by being adapted to the response of the VVT 10 by the throttle control time constant T even in a deceleration range or the retard angle range of the VVT 10, as shown in the time chart of FIG. 12, when the accelerator position differential value DLAP to the closing side of the accelerator position Ap as an accelerator position is equal to a predetermined value γ or larger, the VVT 10 is preliminarily operated to the retard angle side on the basis of the accelerator position Ap and is delayed for a predetermined time. After that, the throttle valve 14 is closed, thereby enabling the misfire of the IC engine 1 caused by increase in the internal EGR due to the delay of the VVT 10 from the rapid retard angle operation of the VVT 10 to be prevented.

According to the valve timing control for the IC engine of the embodiment, independent from the accelerator position Ap as an accelerator pedal position controlled by the CPU 21 in the ECU 20, the opening angle of the throttle valve 14 for adjusting the intake air amount of the IC engine 1 is corrected by the CPU 21 in the ECU 20 on the basis of the response of the VVT 10 estimated by the CPU 21 in the ECU 20. Consequently, when the fluid temperature is low and the response of the VVT 10 is slow, the opening angle of the throttle valve 14 is corrected and controlled according to the response, so that the effectiveness of the VVT 10 is maximally used and the engine exhaust emission, fuel consumption, and the like are improved. Further, when the response of the VVT 10 is slow, by suppressing rapid acceleration, occurrence of misfire can be prevented.

Although the temperature of the operating fluid is directly detected by the fluid temperature sensor 7 in the VVT response estimation in the foregoing embodiments, the invention is not limited to the above. The WT response may be also estimated from a transition state of the cooling water temperature of the IC engine, a transition state of the temperature of a cylinder wall, the cooling water temperature at the time of start, elapsed time, and the like.

In the valve timing control for the IC engine, the fluid temperature sensor indirectly detects the fluid temperature THO on the basis of at least one of the cooling water temperature of the IC engine 1, the cooling water temperature at the time of start, the elapsed time after the start, the number of ignition times after the start, and the number of fuel injection times after the start. That is, since the temperature of the operating fluid is estimated on the basis of the transition state of the cooling water temperature in the operating condition of the IC engine 1 and the total heating value obtained by an explosion stroke of the IC engine and friction of a cylinder and the like, it is not always necessary to use the fluid temperature sensor in the foregoing embodiment.

The present invention should not be limited to the disclosed embodiment and its modification, but may be altered or changed also without departing from the spirit of the invention.

What is claimed is:

1. A valve timing control system for an internal combustion engine, comprising:

a valve timing control mechanism which is provided in a drive force transmitting system for transmitting a drive force from a drive shaft of an internal combustion engine to a driven shaft which opens and closes at least one of an inlet valve and an exhaust valve;

throttle opening angle control means for controlling an opening angle of a throttle valve for adjusting an intake amount of the internal combustion engine based on a position of an accelerator pedal;

response estimating means for estimating a response of the valve timing control mechanism from a parameter corresponding to temperature; and throttle opening angle correcting means for correcting the opening angle of the throttle valve controlled by the throttle opening angle control means on the basis of the estimated response.

2. The control system according to claim 1, wherein:

the valve timing control mechanism is driven by a fluid pressure; and the response estimating means estimates the response on the basis of temperature of an operating fluid of the valve timing control mechanism.

3. The control system according to claim 2, wherein:

the response estimating means includes response correcting means for correcting the estimated response by a rotation speed of the internal combustion engine.

4. The control system according to claim 2, wherein:

the response estimating means calculates the temperature on the basis of at least one of present temperature of cooling water of the internal combustion engine, cooling water temperature at the time of starting, elapsed time since starting, the number of ignition times after starting, and the number of fuel injection times after starting.

5. The control system according to claim 1, wherein:

the throttle opening angle correcting means calculates a time constant from the response of the valve timing control mechanism when the opening angle of the throttle valve is controlled by the throttle opening angle control means and corrects the opening angle of the throttle valve by using the time constant.

6. The control system according to claim 1, wherein:

the throttle opening angle correcting means controls the valve timing control mechanism to a retard angle side on the basis of the position of the accelerator pedal when the response of the valve timing control mechanism is slow and the operating condition of the internal combustion engine is rapidly shifted to an engine deceleration and includes throttle closing means which closes the throttle valve with a predetermined delay time from the position of the accelerator pedal.

7. A control method for an internal combustion engine having a throttle valve and a valve timing control mechanism which controls at least one of an inlet valve and an exhaust valve, the method comprising the steps of:

estimating a response of the valve timing control mechanism from a parameter corresponding to temprature; and determining an opening angle of a throttle valve of the engine based on a position of an accelerator pedal;

correcting the opening angle of the throttle valve based on the estimated response; and driving the throttle valve electronically based on the corrected opening angle.

8. The control method according to claim 7, wherein:

the estimating step estimates the response on the basis of temperature of an operating fluid of the valve timing control mechanism.

9. The control method according to claim 8, wherein:

the estimating step includes correcting the estimated response by a rotation speed of the engine.

10. The control method according to claim 8, wherein:

the estimating step calculates the temperature on the basis of at least one of present temperature of cooling water of the internal combustion engine, cooling water temperature at the time of starting, elapsed time since starting, the number of ignition times after starting, and the number of fuel injection times after starting.

11. The control method according to claim 7, wherein:

the correcting step calculates a time constant from the response of the valve timing control mechanism when the throttle valve is controlled and corrects the opening angle of the throttle valve by using the time constant.

12. The control method according to claim 7, wherein:

the correcting step controls the valve timing control mechanism to a retard angle side on the basis of the position of the accelerator pedal when the response of the valve timing control mechanism is slow and the operating condition of the engine is rapidly shifted to an engine deceleration, and closes the throttle valve with a predetermined delay time from the position of the accelerator pedal.

13. A ncontrol system as in claim 1 wherein:

the valve timing control mechanism is a fluid-operated type and operative to vary a difference in rotation angles of the drive shaft and the driven shaft.

14. A control system as in claim 7 wherein:

the valve timing control mechanism is a fluid-operated type and operative to vary a difference in rotation angles of the drive shaft and the driven shaft.

15. A valve timing control system for an internal combustion engine said system comprising:

a valve timing control mechanism, a throttle control which adjusts engine intake based on accelerator pedal position;

a valve control response time estimator using a parameter corresponding to temperature to produce an estimated response signal; and said throttle control adjusting throttle valve opening on the basis of the estimated response signal.

16. A method for controlling a throttle valve of an engine having a valve timing control mechanism, the method comprising the steps of:

estimating the response time of the valve timing control mechanism using a parameter corresponding to its temperature; and driving the throttle valve opening electronically based at least in part on the estimated response time of the valve timing control mechanism.

* * * * *